United States Patent
Skaggs et al.

(10) Patent No.: US 6,714,981 B1
(45) Date of Patent: Mar. 30, 2004

(54) ADDRESSING SYSTEM AND METHOD FOR COMMUNICATING DATA

(75) Inventors: Terrence L. Skaggs, Boise, ID (US); David Banks, Bristol (GB); Gary D. Zimmerman, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/499,191

(22) Filed: Feb. 7, 2000

(51) Int. Cl.[7] .................................................. G06F 15/16
(52) U.S. Cl. ........................ 709/227; 709/227; 709/245; 709/250; 709/226
(58) Field of Search ................................. 709/227, 204, 709/226, 245, 206, 207, 250; 707/10

(56) References Cited

U.S. PATENT DOCUMENTS

| | | | | |
|---|---|---|---|---|
| 5,537,543 A | * | 7/1996 | Itoh et al. ..................... | 714/48 |
| 5,805,810 A | * | 9/1998 | Maxwell ..................... | 709/206 |
| 5,864,670 A | * | 1/1999 | Hayashi et al. ............. | 370/260 |
| 5,923,848 A | * | 7/1999 | Goodhand et al. .......... | 709/219 |
| 5,966,705 A | * | 10/1999 | Koneru et al. ................ | 707/9 |
| 6,275,865 B1 | * | 8/2001 | Zou ........................ | 369/13.13 |
| 6,301,612 B1 | * | 10/2001 | Selitrennikoff et al. ..... | 709/220 |

FOREIGN PATENT DOCUMENTS

| | | |
|---|---|---|
| EP | 0606720 A2 | 7/1994 |
| JP | 050308376 A | 11/1993 |
| JP | 100240648 A | 5/1998 |
| JP | 100126600 A | 9/1998 |

* cited by examiner

Primary Examiner—Zarni Maung
Assistant Examiner—Sahera Halim

(57) ABSTRACT

An addressing system and method are provided for reducing or eliminating an amount of input from an individual into a data communications device to facilitate data transfer. The addressing system facilitates data communications between a number of user devices linked to a data communications network. The addressing system includes a number of globally unique identifiers, each of the globally unique identifiers being associated with a respective one of the user devices linked to the data communications network. The addressing system also includes a number of user names, each of the user names is associated with one of the user devices, the user names being subject to change. A correlation table stored in a central service device that is in data communication with the user devices. The correlation table links each of the user names to a corresponding one of the globally unique identifiers. The central service device employs the globally unique identifiers to search a user database for a number of linking parameters to establish a data transfer between at least two of the user devices in an automated fashion.

10 Claims, 5 Drawing Sheets

ADDRESSING SYSTEM AND METHOD FOR COMMUNICATING DATA

TECHNICAL FIELD

The present invention is generally related to the field of data communications, and more particularly, is related to an addressing system and method for communicating data between devices.

BACKGROUND OF THE INVENTION

With the dawn of the information age, modern data communications technology has become more and more complex. For example, a popular form of data communication is via electronic mail. It is often the case that email is accessed using a computer or other device that is linked to the Internet through an appropriate service provider.

The down side of email is that there are many individuals in society who have not embraced computer technology and will not use computers or other advanced technology, thus losing a valuable tool to communicate with others including friends and family members. Such individuals find the complexity of such devices intimidating and, rather than take on the challenge of using such technology, they shun the use of it. For example, the prospect of "logging," or connecting, on line with a service provider to gain access to the Internet or other similar network seems daunting to many individuals.

SUMMARY OF THE INVENTION

In light of the foregoing, the present invention provides an addressing system and method for reducing or eliminating the input from an individual to facilitate data transfer. According to one embodiment, the addressing system facilitates data communications between a number of user devices linked to a data communications network. The addressing system includes a number of globally unique identifiers, each of the globally unique identifiers being associated with a respective one of the user devices linked to the data communications network. The addressing system also includes a number of user names, each of the user names is associated with one of the user devices, the user names being subject to change.

The addressing system also includes a correlation table stored in a central service device that is in data communication with the user devices. The correlation table links each of the user names to a corresponding one of the globally unique identifiers. The central service device employs the globally unique identifiers to search a user database for a number of linking parameters to establish a data transfer between at least two of the user devices in an automated fashion.

The user initiates a data transfer by identifying a friendly name in a transmitting user device from a menu, where the user name is associated with the recipient of the data transfer. As an additional feature, the user may identify a friendly name that is associated with themselves as the sender of the data transmission. The transmitting device employs the information chosen to automatically link with a receiving device with the aid of the central service device and cause the data transfer.

The present invention may also be viewed as a method for facilitating data communication between a number of user devices linked to a data communications network. In this regard, the method can be broadly conceptualized by the following steps: associating a respective one of a number of globally unique identifiers with a respective one of the user devices; associating a number of user names with a respective one of the user devices, the user names being subject to change; and maintaining a correlation table in a central service device that is in data communication with the user devices, the correlation table linking each of the user names to a corresponding one of the globally unique identifiers, where the central service device employs the globally unique identifiers to search a user database for a number of linking parameters to establish a data transfer between at least two of the user devices.

Other features and advantages of the present invention will become apparent to one with skill in the art upon examination of the following drawings and detailed description. It is intended that all such additional features and advantages be included herein within the scope of the present invention.

BRIEF DESCRIPTION OF THE SEVERAL VIEWS OF THE DRAWINGS

The invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION OF THE INVENTION

Figure 1:
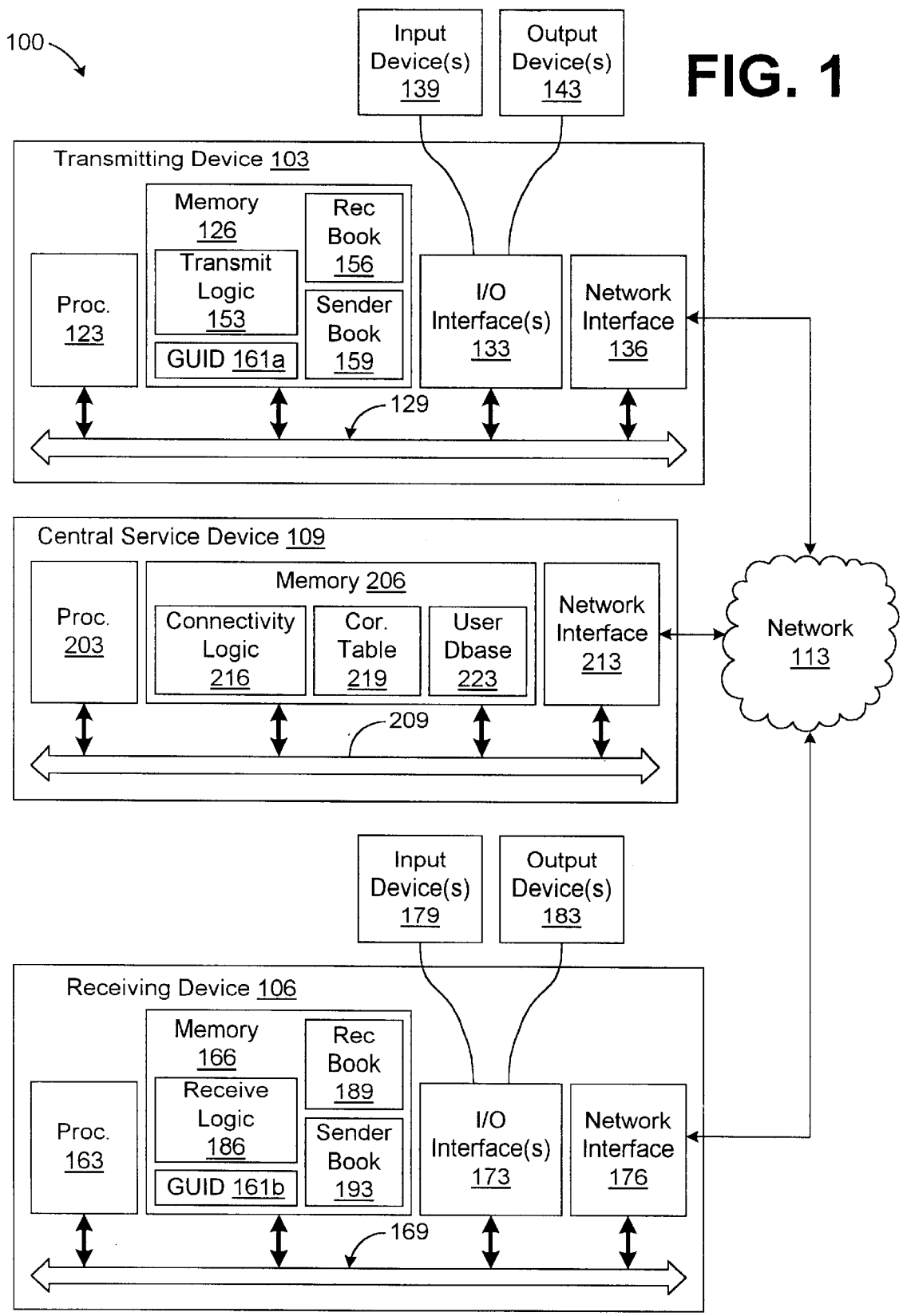
FIG. 1 is a block diagram of a data communications system that employs the addressing scheme according to an embodiment of the present invention.

Turning to FIG. 1, shown is a data communications network according to an embodiment of the present invention. This embodiment is intended to be a nonlimiting example of an implementation, where many others are possible. The data communications network includes a transmitting user device 103, a receiving user device 106, and a central service device 109. The transmitting and receiving user devices 103 and 106 as well as the central service device 109 are all linked to data communications network 113 as shown. The data communications network 113 may comprise, for example, the Internet, a local area network, or a wide area network, etc., in which the transmitting and receiving user devices 103 and 106 are not in continual data communication with the network 113, but log on to the network 113 from time to time. Each time the transmitting and receiving user devices 103 and 106 log on to the network 113, they receive a network address such as an Internet Protocol (IP) address that varies from one log-on session to another.

The transmitting user device 103 includes a processor 123 and a memory 126 as shown. The processors 123 and the memory 126 are linked to a local interface 129. The local interface 129 may comprise, for example, a data bus and accompanying control bus as known by those skilled in the art. The transmitting user device 103 further comprises input/output (I/O) interfaces 133 and a network interface 136. A number of input devices 139 and output devices 143 are linked to the local interface 129 via the input/output interfaces 133 as shown. Likewise, the network 113 is linked to the local interface 129 via the network interface 136.

Stored on the memory 126 are transmit logic 153, a recipient address book 156, a sender address book 159 and a first globally unique identifier 161a as shown. The transmit logic 153 stored on the memory 126 is generally executed by the processor 123 to establish data communications with the receiving user device 106 and the central service device 109 as will be discussed.

The receiving user device 106 is similar to the transmitting user device 103. In particular, the receiving user device 106 includes a processor 163 and a memory 166 that are linked to a local interface 169. The receiving user device 106 further comprises input/output interfaces 173 and a network interface 176. A number of input devices 179 and output devices 183 are linked to the local interface 169 via the input/output interfaces 173 as shown. Likewise, the network 113 is linked to the local interface 169 via the network interface 176.

Stored on the memory 166 is receive logic 186, a recipient address book 189, sender address book 193, and a second globally unique identifier 161b as shown. The receive logic 186 stored on the memory 166 is generally executed by the processor 163 to establish data communications with the transmitting user device 103 and the central service device 109 as will be discussed.

While the transmitting and receiving user devices 103 and 106 are discussed herein as including transmit and receive capability alone, it is understood that the transmitting and receiving user devices 103 and 106 include both the transmit and receiving functionality, where the above configuration is provided to facilitate the discussion of the various embodiments of the present invention.

The transmitting and receiving user devices 103 and 106 may comprise, for example, a connectivity box, computer system, or other suitable system or device. The input devices 139 and 179 may comprise, for example, a keypad, push buttons, a keyboard, a microphone, scanner, or other such input devices. The output devices 143 and 183 may comprise a display device such as, for example, a cathode ray tube (CRT), a liquid crystal display screen, a gas plasma-based flat panel display, indicator lights, light emitting diodes, and other display devices. The output devices 143 and 183 may also include a printer, etc.

The central service device 109 also includes a processor 203 and a memory 206, both of which are linked to a local interface 209. The central service device 109 also includes a network interface 213 that links the network 113 to the local interface 209 in similar fashion to the network interfaces 136 and 176. The central service device 109 also includes connectivity logic 216 that is stored on the memory 206 and executed by the processor 203. The connectivity logic is executed to facilitate data communications between the transmitting user device 103 and the receiving user device 106 as will be discussed. Also stored on the memory 206 is a correlation table 219 and a user database 223. Both the correlation table 219 and the user database 223 are accessed by the connectivity logic 216 in performing the various tasks as will be discussed.

The memories 126, 166, and 206 of the transmit, receive, and central service devices 103, 106, and 109, respectively, include both volatile and nonvolatile memory components. Volatile components are those that do not retain data values upon loss of power. Conversely, nonvolatile components retain data upon a loss of power. The memories 126, 166, and 206 may include, for example, random access memory (RAM), read-only memory (ROM), hard disk drives, floppy disk drives, compact disk drives, tape drives, and/or other memory components.

Figure 2:
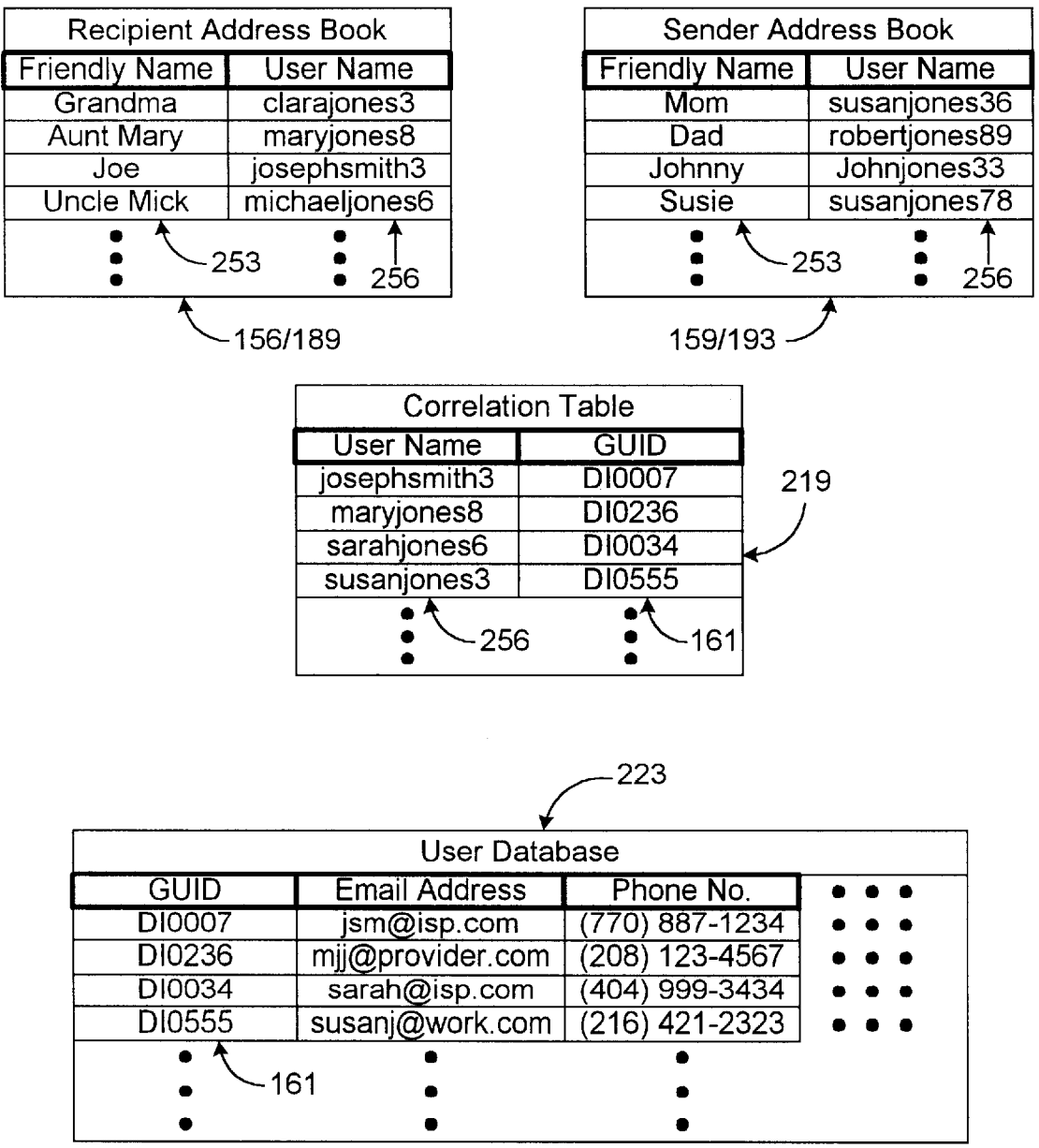
FIG. 2 is a drawing of addressing tables employed in the addressing scheme of FIG. 1.

Turning to FIG. 2, shown are examples of the recipient address books 156/189, the sender address books 159/193, the correlation table 219, and the user database 223 according to an embodiment of the present invention. Both the recipient address books 156/189 and the sender address books 159/193 include friendly names 253 and user names 256. As shown, a particular friendly name 253 corresponds to a particular user name 256. The correlation table 219 includes a first column for user names 256 and a second column for globally unique identifiers 161. In the correlation table 219, a particular user name 256 is associated with a particular globally unique identifier 161 as shown. Finally, the user database 223 includes a first field of the globally unique identifiers 161 and then several other fields associated therewith, including e-mail addresses, telephone numbers, billing account number, a billing name, billing street address, and other information.

Next, the operation of the data communications network 100 is described in the context of a single data transfer transaction from a sender who employs the transmitting user device 103 to transmit data to a recipient who receives the information via the receiving user device 106. Assuming that the sender has data to transmit to the recipient, the data itself is included on the memory 126 having been transferred from one of a number of different input devices 139 such as scanners, digital cameras or other like devices. Alternatively, the sender may generate the data to be transmitted via the various input devices such as, a keyboard or other similar instrument.

To transmit the data from the transmitting user device 103 to the receiving user device 106, the sender identifies a particular recipient of the data to be transmitted by choosing one or more of the friendly names 253 in the recipient address book 156. Although a single receiving user device 106 is shown herein, it is understood that the data transaction may occur from a single transmitting user device 103 to multiple receiving devices 106, where the user would specify the friendly names 253 of multiple recipients. The transmit logic 153 identifies an associated user name 256 with the friendly name 253 in the recipient address book 156. As an added function, the sender may identify himself or herself using the sender address book 159 by indicating their associated friendly name 253. The transmit logic 153 of the transmitting user device 103 identifies an associated user name 256 from the sender's friendly name 253.

Thereafter, through the various input devices 139 such as a keyboard or push button, the user causes the data transaction to begin. The transmitting user device 103 then transmits the user name 256 of the recipient, the user name 256 of the sender, and the globally unique identifier 161 of the transmitting user device 103 to the central service device 109. Pursuant to the connectivity logic 216 of the central service device 109, the globally unique identifier 161 that correlates to the user name 256 of the recipient is identified using the correlation table 219.

From there, the connectivity logic 216 identifies the same globally unique identifier 161 of the recipient in the user database 223. Associated therewith is a telephone number or other means by which the connectivity logic 216 can establish data communications with the receiving user device 106. For example, the central service device 109 might generate a telephone call to the receiving user device 106 that brings the receiving user device 106 on line with the network 113. The receiving user device 106 receives a network address (such as an IP address) from the network 113 that it transmits to the central service device 109. Specific approaches that may be employed to establish data communications with the receiving user device 106 are described in United States patent applications entitled "Limit Ring Wake Up" filed on May 14, 1999 and assigned Ser. No. 09/313,544, and "IP Link Initiation" filed on Apr. 30, 1999 and assigned Ser. No. 09/303,395, now U.S. Pat. No. 6,526,131both of which are incorporated herein by reference in their entirety.

After the receiving user device 106 is brought on line, then the central service device 109 provides the user names 256 of the recipient and the sender to the receiving user device 106. Also, the central service device 109 provides the network address of the receiving user device 106 to the transmitting user device 103 to allow the transmitting user device 103 to transmit data directly to the receiving user device 106 via the network 113. The central service device 106 then informs the transmitting user device 103 that it can begin data transfer to the receiving user device 106. The transmitting user device 103 then transmits the data to the receiving user device 106 via the network 113.

The receiving user device 106 then determines whether the user name 256 of the recipient identified from the recipient address book 156 exists in the sender address book 193 from which a corresponding friendly name 253 may be generated to identify the individual to whom the data is addressed. That individual may then access the data accordingly by identifying themselves to the receiving user device 106 using their friendly name 253.

It is a significant advantage of the present invention that the sender and the recipient need only to remember the friendly names 253 associated with themselves and with the individuals to whom they send data. In addition, the globally unique identifier 161 associated with the transmitting user device 103 supplied to the central service device 109 is employed by the central service device 109 to generate billing information by which the sender is billed for the transaction accordingly. In particular, the central service device 109 will look up the billing information from the user database 223 keyed on an appropriate globally unique identifier 161a from the transmitting user device 103.

Figure 3:
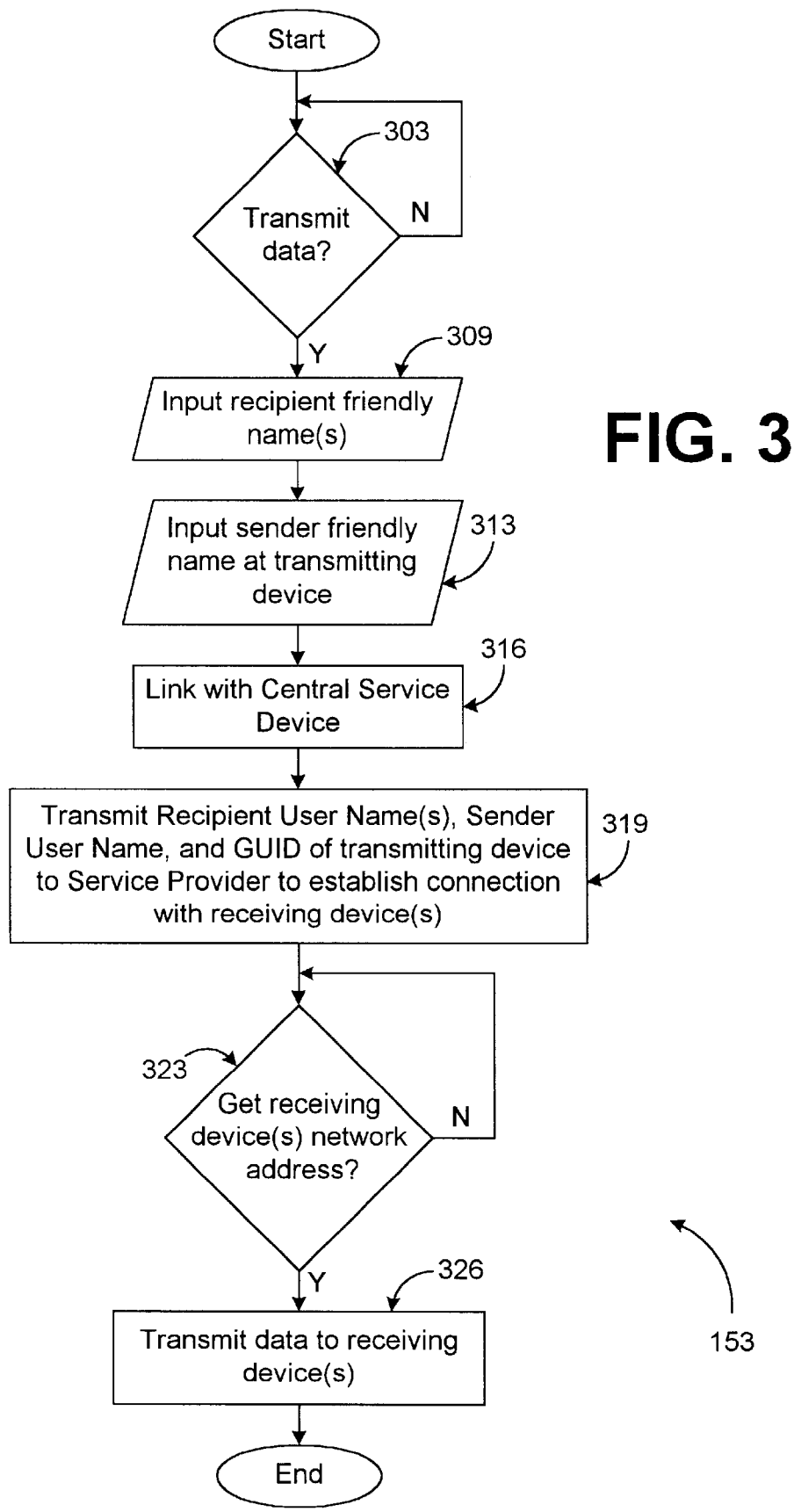
FIG. 3 is a flow chart of transmit logic executed by a number of user devices in the data communications system of FIG. 1.

With reference to FIG. 3, shown is a flow chart of the transmit logic 153 according to an embodiment of the present invention. The transmit logic 153 is executed by the processor 123 in the transmitting user devices 103 in performing the various related tasks discussed previously. Beginning with block 303, the logic 153 determines whether or not a message is to be transmitted. Such a condition may exist for example, when the user initiates a data transfer via an appropriate input device, etc. In this manner, the transmit logic 153 waits for a particular transmit event to occur before further action.

Assuming that a message is to be transmitted in block 303, the transmit logic 153 progresses to block 309 in which the appropriate friendly name 253 (FIG. 2) associated with the recipient is identified by the sender. Thereafter, in block 313 the friendly name associated with the sender of the data transfer is also specified by the sender. Then, in block 316 the transmitting user device 103 (FIG. 1) establishes a communication link with the central service device 109 (FIG. 1) via the network 113 (FIG. 1).

Then, in block 319, the logic 153 transmits to the central service device 109 the user name of the recipient who is to receive the data transmission. Also, the transmitting user device 103 sends the user name of the sender identified from the sender address book 159 as well as the globally unique identifier 161a associated with the transmitting user device 103. In block 323 the transmitting user device 103 waits to receive the network address of the receiving user device 106 from the central service device 109, thereby indicating that the receiving user device 106 is on-line and ready to receive the data transmission. Once the network address of the receiving user device 106 is received, then the logic 153 progresses to block 326 in which the data is transmitted from the transmitting user device 103 to the receiving user device 106. Once the transmission is complete, then the logic 153 ends accordingly.

Figure 4:
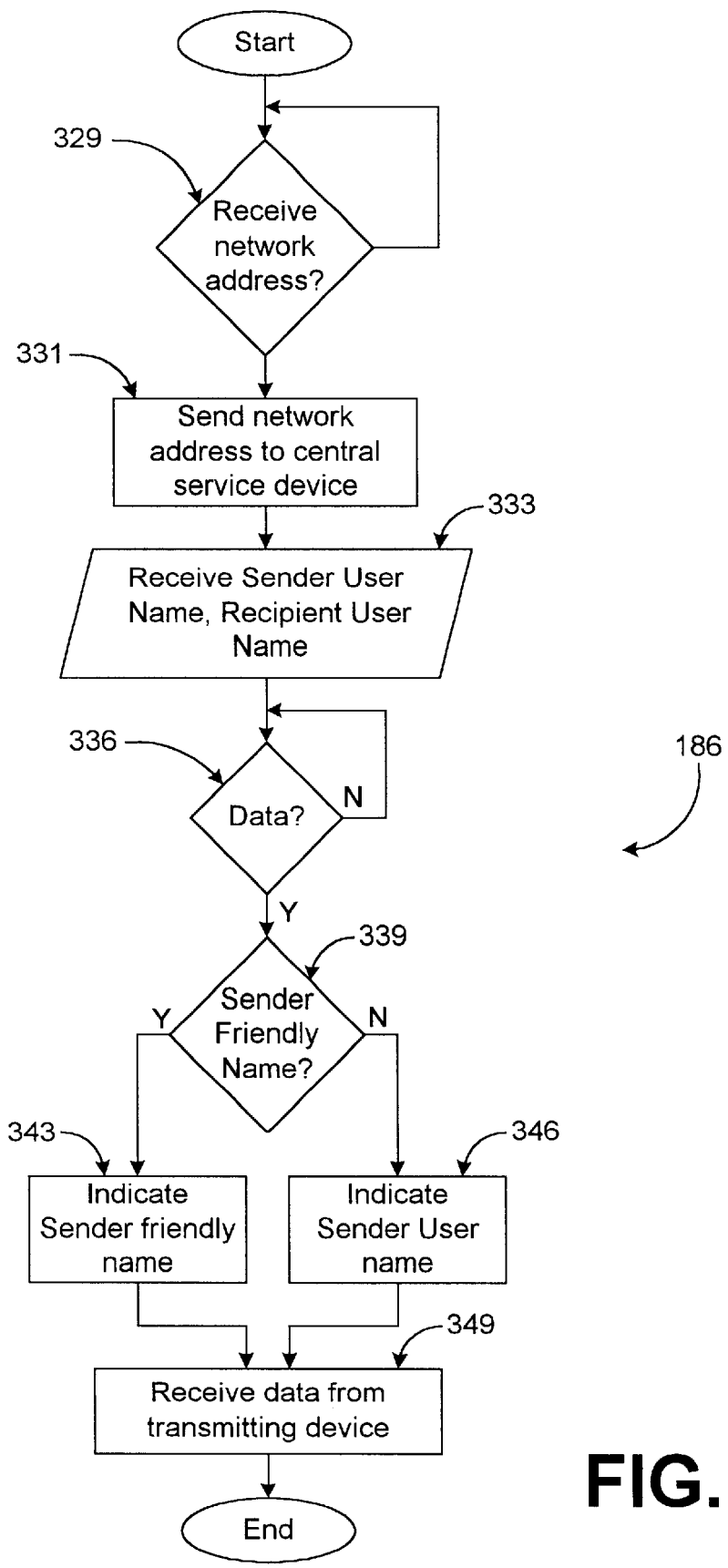
FIG. 4 is a flow chart of receive logic executed by a number of user devices in the data communications system of FIG. 1.

With reference then to FIG. 4, shown is a flow chart of the receive logic 186 according to an embodiment of the present invention. Assuming that the receiving user device 106 has begun to log on with the network 113 (FIG. 1), the receive logic 186 begins with block 329 in which it waits to receive a network address from the network 113. Once the network address is received in block 329, the receive logic 186 progresses to block 331 in which the network address is transmitted to the central service device 109 (FIG. 1). Then, in block 333, the receive logic 186 receives the user names 256 of the recipient and the sender from the central service device 109. Alternatively, the user names 256 of the recipient and the sender may be received from the transmitting user device 103.

Next, in block 336, the receive logic 186 waits for data to be received from the transmitting user device 103. Thereafter, in block 339, it is determined whether the user name 256 of the sender of the data corresponds with a user name 256 in the sender address book 193 of the receiving user device 106. If so, then the logic 186 progresses to block 343 in which the friendly name 253 that corresponds to the sender's user name 256 is displayed with the data received via an appropriate output device such as a display device or printer, etc. If in block 339, there is no corresponding friendly name 253 for the user name 256 of the sender, then the logic moves to block 346 in which the user name 256 of the sender is displayed with the data that was received.

After blocks 343 or 346, the logic 186 moves to block 349 in which the data from the transmitting user device 103 is received accordingly. Thereafter the logic 186 ends as shown.

Figure 5:
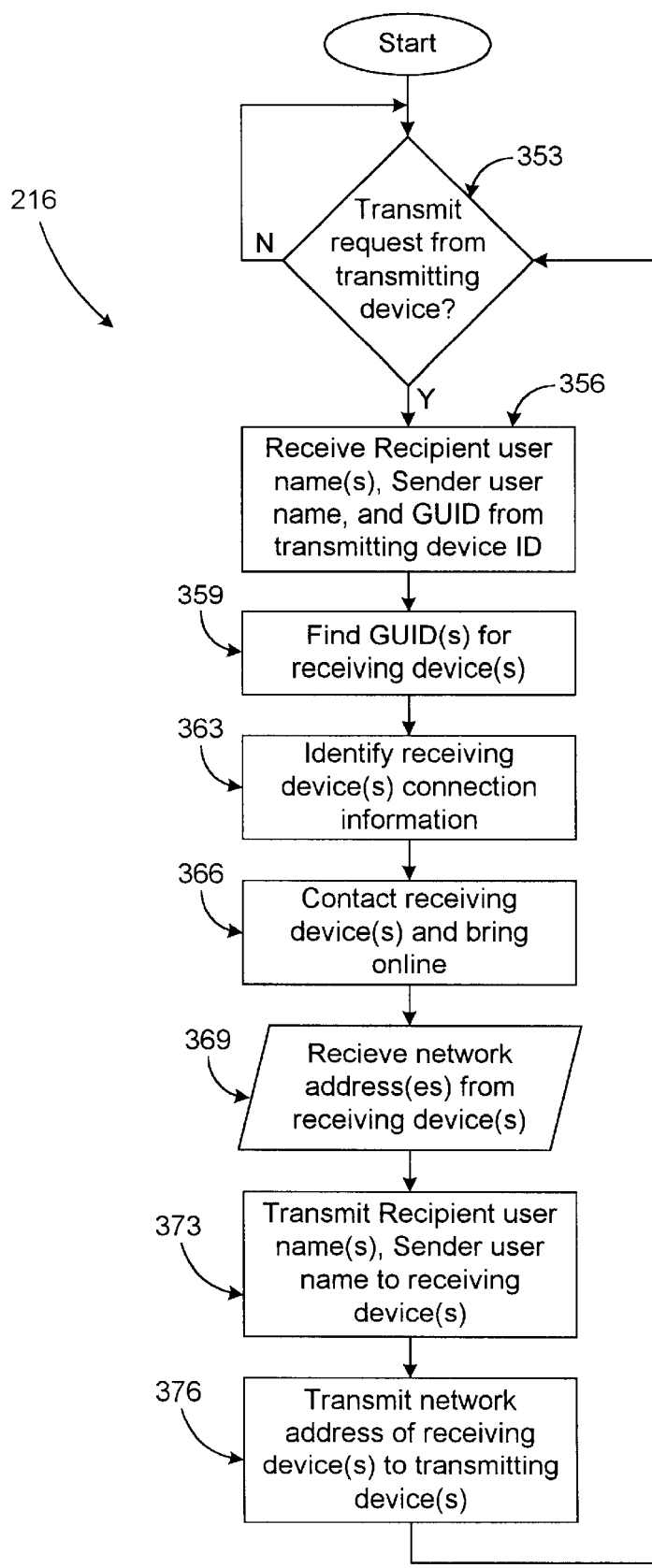
FIG. 5 is a flow chart of connectivity logic executed by a central service device of FIG. 1.

Finally, with reference to FIG. 5, shown is a flow chart of the connectivity logic 216 according to another embodiment of the present invention. The connectivity logic 216 is executed in the central service device 109 to cause the receiving user device 106 to be brought on line to facilitate a data transfer from the transmitting user device 103. Accordingly, the connectivity logic 216 begins with block 353 in which a transmit request from the transmitting user device 103 is detected. Once the transmit request is detected, then the logic 216 moves to block 356 in which the user names 256 (FIG. 2) of the recipient and the sender of the data transmission as well as the globally unique identifier 161 (FIG. 2) of the transmitting user device 103 are received from the transmitting user device 103. Thereafter, in block 359 the globally unique identifier 161 for the receiving user device 106 is identified in the correlation table 219. Then, in block 363 the information necessary to cause the receiving user device 106 to link with the central service device 109 via the network 113 is identified in the user database 223.

In block 366, the receiving user device 106 is "awakened" by the central service device 109 using an appropriate means such as, calling the receiving user device 106 via telephone lines or other connection. Then, in block 369 the network address is received from the receiving user device 106, and in block 373 the user names 256 of the recipient and the sender are transmitted to the receiving user device 106. Finally, in block 376, the network address of the receiving user device 106 is transmitted to the transmitting user device 103 so that it can communicate directly with the receiving user device 106 via the network 113 (FIG. 1). Thereafter, the logic 216 reverts back to block 353 to wait for the next transmit request.

In addition to the foregoing discussion, the logic 153, 186, and 216 of the present invention can be implemented in hardware, software, firmware, or a combination thereof. In the preferred embodiment(s), the logic 153, 186, and 216 is implemented in software or firmware that is stored in a memory and that is executed by a suitable instruction execution system. If implemented in hardware, as in an alternative embodiment, the logic 153, 186, and 216 can implemented with any or a combination of the following technologies, which are all well known in the art: a discrete logic circuit(s) having logic gates for implementing logic functions upon data signals, an application specific integrated circuit having appropriate logic gates, a programmable gate array(s) (PGA), a field programmable gate array (FPGA), etc.

Also, the flow charts of FIGS. 3–5 show the architecture, functionality, and operation of a possible implementation of the logic 153, 186, and 216. In this regard, each block represents a module, segment, or portion of code, which comprises one or more executable instructions for implementing the specified logical function(s). It should also be noted that in some alternative implementations, the functions noted in the blocks may occur out of the order noted in FIGS. 3–5. For example, two blocks shown in succession in FIGS. 3–5 may in fact be executed substantially concurrently or the blocks may sometimes be executed in the reverse order, depending upon the functionality involved.

Finally, the logic 153, 186, and 216, which comprises an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (magnetic), a read-only memory (ROM) (magnetic), an erasable programmable read-only memory (EPROM or Flash memory) (magnetic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

Many variations and modifications may be made to the above-described embodiment(s) of the invention without departing substantially from the spirit and principles of the invention. All such modifications and variations are intended to be included herein within the scope of the present invention.

What is claimed is:

1. An addressing system to facilitate a data communication between a number of user devices linked to a data communications network, comprising:

a number of globally unique identifiers, each of the globally unique identifiers being associated with a respective one of the user devices and being distinct from a network address on the data communications network of the respective one of the user devices;

a number of user names, each of the user names being associated with one of the user devices, the user names being subject to change; and a central service device coupled to each of the user devices through a data communications network;

a correlation table stored in the central service device, the correlation table linking each of the user names to a corresponding one of the globally unique identifiers, wherein the central service device employs the globally unique identifiers to search a user database for a contact parameter associated with a receiving one of the user devices, the central service device employing the contact parameter to bring the receiving one of the user devices online with the data communications network to communicate with a transmitting one of the user devices.

2. The addressing system of claim 1, further comprising a number of address books, each of the address books being stored in a respective one of the user devices, the address books including at least one of the user names and at least one friendly name, the at least one friendly name being associated with a respective one of the user names.

3. The addressing system of claim 1, wherein the user database is keyed off of the globally unique identifiers to identify the contact parameter.

4. An addressing system to facilitate data communication between a number of user devices linked to a data communications network, comprising:

first means for uniquely identifying each of the user devices linked to the data communications network, the first means being distinct from a network address on the data communications network of the respective one of the user devices;

second means for identifying a user associated with each of the user devices, the second means being subject to change; and third means for linking each of the first means with a respective one of the second means, the third means being stored in a central service device that is in data communication with the user devices, wherein the central service device employs the first means to search a user database for a contact parameter associated with a receiving one of the user devices, the central service device employing the contact parameter to bring the receiving one of the user devices online with the data communications network to communicate with a transmitting one of the user devices.

5. The addressing system of claim 4, further comprising a means for correlating at least one of the second means with a respective friendly name in each of the user devices.

6. The addressing system of claim 4, wherein the user database is keyed off of the first means to identify the contact parameter for the receiving one of the user devices.

7. An addressing method to facilitate a data communication between a number of user devices linked to a data communications network, comprising the steps of:

associating a number of globally unique identifiers with a corresponding number of the user devices, respectively, the globally unique identifiers being distinct from a network address on the data communications network of the respective one of the user devices;

associating each one of a number of user names with a respective one of the user devices, the user names being subject to change; and maintaining a correlation table in a central service device that is in data communication with the user devices, the correlation table linking each of the user names to a corresponding one of the globally unique identifiers;

identifying one of the globally unique identifiers associated with a receiving one of the user names in the correlation table; and searching a user database stored in the central service device based upon the identified one of the globally unique identifiers for a contact parameter associated with a receiving one of the user devices that is associated with the receiving one of the user names;

employing the contact parameter in the central service device to bring the receiving one of the user devices online with the data communications network if the receiving one of the user devices is offline to communicate with a transmitting one of the user devices.

8. The addressing method of claim 7, further comprising the step of correlating at least one of the user names with at least one friendly name in the user devices.

9. The addressing method of claim 7, wherein the step of employing the contact parameter in the central service device to bring the receiving one of the user devices online with the data communications network further comprising the step of implementing a telephone call from the central service device to the receiving one of the user devices, wherein the contact parameter is a telephone number.

10. The addressing method of claim 7, further comprising the step of receiving a network address in the central service device from the receiving one of the user devices, the network address being associated with the receiving one of the user devices after the receiving one of the user devices is brought online with the data communications network.

* * * * *